US 6,562,762 B2

(12) United States Patent
Cowan et al.

(10) Patent No.: US 6,562,762 B2
(45) Date of Patent: May 13, 2003

(54) METHOD OF AND COMPOSITION FOR REDUCING THE LOSS OF FLUID DURING WELL DRILLING, COMPLETION OR WORKOVER OPERATIONS

(75) Inventors: Jack C. Cowan, Lafayette, LA (US); Michael J. Kilchrist, Lafayette, LA (US)

(73) Assignee: Venture Chemicals, Inc., Lafayette, LA (US)

( * ) Notice: Subject to any disclaimer, the term of this patent is extended or adjusted under 35 U.S.C. 154(b) by 15 days.

(21) Appl. No.: 09/898,856

(22) Filed: Jul. 3, 2001

(65) Prior Publication Data

US 2001/0053749 A1 Dec. 20, 2001

Related U.S. Application Data

(63) Continuation-in-part of application No. 09/222,293, filed on Dec. 28, 1998, now Pat. No. 6,258,755.

(51) Int. Cl.$^7$ ................................................. C09K 7/02
(52) U.S. Cl. ................. 507/110; 507/209; 507/211; 507/925; 166/282; 536/20; 536/55.3
(58) Field of Search ............... 536/20, 55.3; 507/110, 507/209, 211, 925; 166/282

(56) References Cited

U.S. PATENT DOCUMENTS

| | | | | | |
|---|---|---|---|---|---|
| 5,442,048 | A | * | 8/1995 | Meister | 536/20 |
| 6,277,792 | B1 | * | 8/2001 | House | 507/110 |
| 6,291,404 | B2 | * | 9/2001 | House | 507/110 |
| 6,358,889 | B2 | * | 3/2002 | Waggenspack | 507/110 |

* cited by examiner

Primary Examiner—Philip Tucker
(74) Attorney, Agent, or Firm—Roy F. House

(57) ABSTRACT

Disclosed is a composition for and method of reducing the loss of fluid from well drilling, completion, or workover fluids during well drilling, completion, or workover operations, particularly for reducing or overcoming the lost circulation of drilling fluids. The composition comprises an aqueous liquid containing partially hydrated chitosan particles wherein the chitosan particles have been partially hydrated at a pH less than about 4.5, and wherein the aqueous liquid has a pH of at least about 6.5 such that any further solublizing of the chitosan is prevented. The aqueous liquid, preferably when mixed with a drilling, completion, or workover fluid, is effective in decreasing the loss of such fluids after introducing the partially hydrated chitosan-containing liquid or fluid into the flow passages in a well to which such fluids are being lost.

20 Claims, No Drawings

METHOD OF AND COMPOSITION FOR REDUCING THE LOSS OF FLUID DURING WELL DRILLING, COMPLETION OR WORKOVER OPERATIONS

This patent application is a continuation-in-part of U.S. patent application Ser. No. 09/222,293 filed Dec. 12, 1998 now U.S. Pat. No. 6,258,755.

This invention was made with Government support under Award No. DMI-9901868 awarded by the National Science Foundation. The Government has certain rights in this invention.

BACKGROUND OF THE INVENTION

The present invention relates to a novel method of controlling the loss of fluid during well drilling, completion and workover operations to permeable subterranean formations encountered during such operations. More particularly the invention relates to the use of partially hydrated polymer particles in an aqueous liquid to reduce the loss of fluid to permeable subterranean formations contacted by the aqueous liquid.

During the drilling of an oilwell, a usually aqueous fluid is injected into the well through the dill pipe and recirculated to the surface in the annular area between the wellbore wall and the drill string. The functions of the drilling fluid include: lubrication of the drill bit, transportation of cuttings to the surface, overbalancing formation pressure to prevent an influx of oil, gas or water into the well, maintenance of hole stability until casing can be set, suspension of solids when the fluid is not being circulated and minimizing fluid loss into and possible associated damage/instability to the formation through which drilling is taking place.

Proper overbalancing of formation pressure is obtained by establishing fluid density at the desired level usually via the addition of barite. Transportation of cuttings and their suspensions when the fluid is not circulating is related to the fluid viscosity and thixotropy which depend on solids content and/or use of a polymer. Fluid loss control is obtained also by the use of clays and/or added polymers.

Fluid properties are constantly monitored during the drilling operations and tailored to accommodate the nature of the formation stratum being encountered at the time. When drilling reaches the producing formation, special concern is exercised. Preferentially, low solids content fluids are used to minimize possible productivity loss by solids plugging. Proper fluid density for overbalancing formation pressure may be obtained using high salt concentration aqueous brines while viscosity and fluid loss control generally are attempted by polymer addition.

Completion fluids are those fluids used after drilling is complete and during the steps of completing the well. Completion can include cementing the casing in the well, perforating the well, setting the tubing, pump and the like. Completion fluids are generally used to control the well pressure, provide fluid loss control, and to prevent the collapse of tubing from overpressure.

Workover fluids are those fluids used after the well has been producing which has developed problems which need to be remediated.

In the rotary drilling of wells, the drilling operation depends on a continuous circulation of drilling fluid from the earth's surface to the bottom of the wellbore and back to the surface of the earth. As the drilling progresses, various earth formations are encountered and many of these formations have openings in them ranging from small holes and cracks to large fissures and the like. When such openings in the formations are encountered, drilling fluid flows into them and, in many cases, circulation stops, so that it is necessary to seal the opening before the drilling can be continued.

The problem of combating lost circulation in drilling wells is often very difficult to solve. By far the greater number of serious lost circulation zones are found at relatively shallow depths where temperatures are low. Lost circulation is combated in many ways such as by adding granular, flake, or fibrous material of various sizes to the drilling mud. On some occasions such remedial measures are unsuccessful and other approaches are tried. One of the other approaches is to place cement in the wellbore to fill the voids and fissures which caused the lost circulation.

The following U.S. patents disclose various methods of decreasing the loss of fluids during well drilling, completion and/or workover operations: Nguyen et al.—U.S. Pat. No. 5,680,900; Hessert—U.S. Pat. No. 3,818,998; Sandiford et al.—U.S. Pat. No. 4,643,255; Sydansk—U.S. Pat. No. 4,957,166; Fox et al.—U.S. Pat. No. 5,849,674; Walker—U.S. Pat. No. 4,635,726; Weaver et al.—U.S. Pat. No. 5,439,057; Hardy et al.—U.S. Pat. No. 5,762,140; Diggs et al.—U.S. Pat. No. 5,888,943; Cremeans—U.S. Pat. No. 4,217,965; Wagener—U.S. Pat. No. 4,428,844; Burts, Jr.—U.S. Pat. No. 6,016,879; Merrill—U.S. Pat. No. 5,377,760.

Goodhue, Jr. et al. U.S. Pat. No. 5,407,909 discloses aqueous fluids for well drilling having suspended therein partially-dissolved or hydrated or dispersible synthetic, natural, or modified natural polymers, such as polysaccharides, gums, biopolymers, and combinations thereof. The polymers are preferably added in a solid granular, flaked, or agglomerated state with the dry particle ranging in size from 0.01 mm to 50 mm, and currently in a range of 0.01 mm to 10.0 mm, and with the majority by weight of the particles being between 0.10 mm and 2.5 mm. The partially-hydrated or functionable, insoluble particles, referred to as "pearls" or "masses", are formed upon hydration in a variety of sizes and shapes. The pearls or masses reduce the fluid loss to the formation by being drawn into the formation voids and completely or partially plugging and sealing these voids. The dry particles, flakes, or crystals of materials used to prepare the slurry are of various sizes. They are produced, sorted, and selected in various particle-size sub-ranges to optimize fluid loss control performance in specific types of granular, vugular, or fractured earth formations.

SUMMARY OF THE INVENTION

The invention provides a process or method of reducing the loss of fluid into flow passages of a subterranean formation during well drilling, completion, or workover operations, the fluid being selected from the group consisting of drilling fluids, completion fluids, and workover fluids, the process comprising: (a) stopping injection of the fluid into a wellbore; (b) introducing into the flow passages an effective amount of an aqueous liquid comprising (1) water; (2) a partially hydrated chitosan, the chitosan particles being partially hydrated at an acidic pH less than about 4.5 and (3) a base to raise the pH of the liquid above about 6.5; and (c) allowing the partially hydrated chitosan particles to be deposited within the flow passages thereby reducing the loss of the fluid upon resuming the well drilling, completion, or workover operation.

The invention further provides a process or method of controlling fluid loss in permeable formations penetrated by a wellbore comprising: (a) admixing an aqueous liquid with an acid to provide the aqueous liquid with a pH less than about 4.5 and chitosan under conditions of shear and for a period of time sufficient to partially hydrate the surface of the chitosan particles but insufficient to completely hydrate and disperse the chitosan particles; (b) admixing the chitosan-containing acidic liquid from step (a) with a base to raise the pH of the liquid to at least about 6.5; (c) introducing the chitosan-containing liquid from step (b) into the wellbore and into contact with a face of the permeable formation; and (d) producing a filter cake comprised of particles of the partially hydrated chitosan upon the face of the formation whereby fluid loss to the formation through the filter cake is reduced.

It is an object of the invention to decrease or prevent the loss of fluid to a subterranean formation during well drilling, completion, or workover operations.

It is another object of the invention to prevent lost circulation of the circulating drilling fluid while drilling a well into a subterranean formation.

It is still another object of the invention to provide a lost circulation-controlling fluid or pill comprising an aqueous liquid containing partially-hydrated particles of chitosan therein.

These and other objects of the invention will be obvious to one skilled in the art on reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The invention provides a method of preventing or overcoming the loss of whole fluid to subterranean formations during well drilling, completion, or workover operations, particularly lost circulation which occurs during the drilling of wells with a circulating drilling fluid.

We have now found that an aqueous fluid containing partially hydrated or solublized chitosan particles is effective in reducing the loss of fluid and preventing lost circulation during well drilling operations.

Chitosan, an amine-containing polysaccharide, is soluble in water at an acidic pH less than about 4.5. Chitosan is insoluble at pH greater than about 6.5, particularly greater than about 7.0, and most particularly greater than about 8.0.

We have found that by partially solublizing chitosan particles at an acidic pH followed by raising the pH to at least about 6.5 to prevent further solublizing of the chitosan, partially hydrated chitosan particles are formed which are effective in preventing or overcoming lost circulation during well drilling operations.

Chitosan is obtained from chitin, a naturally occurring polysaccharide-containing one acetylated amino group per sugar unit, i.e., a polymer of β-1, 4 linked N-acetylated D-glucosamine units. Hydrolysis of chitin with strong aqueous base converts the N-acetylated groups to amino groups. If all of the N-acetylated groups are hydrolyzed, the chitin is said to be 100% deacetylated, and the resulting chitosan is said to have a degree of acetylation of 0%. 100% deacetylation of the chitin is not necessary in the practice of this invention. Thus the chitosan can have a degree of acetylation from 0% to about 70%, preferably from 0% to about 50%, and most preferably from about 0% to about 30%.

A wide variety of acids can be used to solublize chitosan. Such acids include inorganic acids such as hydrochloric acid, nitric acid, and sulfamic acid, and water soluble organic acids represented by the formula: $R-(COOH)_n$ wherein n has a value of 1 to 3 and R represents a mono- or divalent organic radical composed of carbon, hydrogen, and optionally at least one of oxygen, nitrogen, and sulfur. Exemplary organic acids are the mono- and dicarboxylic acids selected from the group consisting of formic, acetic, N-acetylglycine, acetylsalicylic, fumaric, glycolic, iminodiacetic, itaconic, lactic, citric, maleic, malic, nicotinic, 2-pyrrolidone-5-carboxylic, salicylic, succinamic, succinic, ascorbic, aspartic, glutamic, glutaric, malonic, pyruvic, sulfonyldiacetic, thiodiacetic, thioglycolic acids and mixtures thereof.

The preferred acid used to prepare the acidic chitosan solution is selected from the group consisting of (a) carboxylic acids containing from one to three carbon atoms, (b) substituted carboxylic acids containing at least one radical per molecule selected from the group consisting of hydroxyl, amino, chloro, and thio, and containing from one to three carbon atoms, (c) hydrochloric acid, and (d) mixtures thereof.

The concentration of acid should be sufficient to decrease the pH of the solution to less than about 4.5, preferably 4.0 or less.

The basic compound used to raise the pH can be any compatible base which can be determined by routine testing. Preferred basic compounds are the alkali metal and ammonium hydroxides, carbonates and bisulfites, magnesium hydroxide and oxide, calcium hydroxide and oxide, and mixtures thereof. Organic bases such as low molecular weight amines and hydroxyamines, such as ethanolamine and the like, can be used to raise the pH, also in combination with an inorganic basic compound. The pH should be raised to at least 6.5 preferably at least 7.0, and most preferably to at least 8.0.

The fluids of this invention may contain materials well known in the art to provide various characteristics of properties to the fluid. Thus the fluids may contain one or more viscosifiers or suspending agents in addition to the chitosan, weighting agents, corrosion inhibitors, soluble salts, biocides, fungicides, seepage loss control additives, bridging agents, deflocculants, lubricity additives, shale control additives, pH control additives, lost circulation control additives and other additives as desired.

The fluids may contain one or more materials which function as encapsulating or fluid loss control additives to restrict the entry of liquid from the fluid to the contacted formations. Representative materials known in the art include partially solublized starch, gelatinized starch, starch derivatives, cellulose derivatives, humic acid salts (lignite salts), lignosulfonates, gums, synthetic water soluble polymers, and mixtures thereof.

The concentration of chitosan in the fluid will generally be from about 3 ppb to about 10 ppb.

If desired the fluid containing the partially hydrated chitosan can be partially dewatered to remove at least a portion of the free water not associated with the partially hydrated chitosan particles. The partially hydrated chitosan can then be added to a drilling fluid to prevent or overcome the loss of circulation of the drilling fluid during drilling operations.

Alternatively the fluid containing the partially hydrated chitosan particles can be mixed with a drilling fluid to prevent or overcome the loss of circulation of the drilling fluid during drilling operations.

In order to more completely describe the invention, the following non-limiting examples are given. In these examples and in this specification, the following abbreviations may be used: ppb=pounds per 42 gallon barrel; psi=pounds per square inch; and API=American Petroleum Institute.

EXAMPLE 1

A fluid effective for overcoming lost circulation during the drilling of a well in a subterranean formation is prepared as follows: chitosan having a degree of acetylation of 30% obtained from Chitin Works America is slurried in water at a concentration of 3–10 ppb with minimal shear ("wrist action" shaker). Glacial acetic acid in the amount of 3.6 ppb is added and the mixing/shaking continued until the chitosan particles are partially hydrated as indicated by the clear chitosan particles having the appearance of a "fuzzy" layer thereon. The pH of the fluid is then raised to 8 with sodium carbonate to prevent any further solublization of the chitosan.

EXAMPLE 2

Example 1 is repeated substituting for the acetic acid an equivalent amount (i.e., 0.06 equivalents per barrel) of glycolic acid, proprionic acid, sulfamic acid, lactic acid, or hydrochloric acid. Equivalent results are obtained.

EXAMPLE 3

The fluids of Examples 1 and 2 are added to a clay-containing aqueous drilling fluid. Artificial permeable sand beds are created in API low pressure filter cells with a quartz sand having particle sizes from 30 mesh to 60 mesh, United States Sieve Series. Placement of the fluids on the sand beds and applying 100 psi nitrogen pressure results in sealing of the pores of the sand beds and thus decreases the loss of fluid to the sand beds.

EXAMPLE 4

The fluids of Examples 1 and 2 are added to a clay-containing aqueous drilling fluid. An artificial fissure is created in API low pressure filter cells. Placement of the fluids in the filter cells and applying 100 psi nitrogen pressure results in plugging of the fissure.

EXAMPLE 5

Excellent results are obtained in correcting for the loss of drilling fluid into a porous formation of a well borehole by admixing with the drilling fluid quantities of the fluids of Examples 1 and 2. The resultant mixture of drilling fluid and partially hydrated chitosan particles is pumped through the wellbore to contact the lost circulation zone thereof where the particles of partially hydrated chitosan form a fluid-impervious barrier to prevent the passage of drilling fluid from the borehole into the surrounding formations.

What is claimed is:

1. A process of reducing the loss of fluid into flow passages of a subterranean formation during well drilling, completion, or workover operations, the fluid being selected from the group consisting of drilling fluids, completion fluids, and workover fluids, the process comprising: (a) stopping injection of the fluid into a wellbore; (b) introducing into the flow passages an effective amount of an aqueous liquid comprising (1) water; (2) a partially hydrated chitosan, the chitosan particles being partially hydrated at an acidic pH less than about 4.5 and (3) a base to raise the pH of the liquid above about 6.5; and (c) allowing the partially hydrated chitosan particles to be deposited within the flow passages thereby reducing the loss of the fluid upon resuming the well drilling, completion, or workover operation.

2. The process of claim 1 wherein the degree of acetylation of the chitosan is from 0% to about 70%.

3. The process of claim 1 wherein the degree of acetylation of the chitosan is from 0% to about 30%.

4. The process of claim 1 wherein the aqueous liquid introduced into the flow passages has been mixed with the drilling fluid, completion fluid, or workover fluid.

5. The process of claim 1 wherein the concentration of chitosan in the aqueous liquid is from about 3 ppb to about 10 ppb.

6. The process of claim 1 wherein the concentration of chitosan in the aqueous liquid is from about 3 ppb to about 10 ppb, and wherein the degree of acetylation of the chitosan is from 0% to about 70%.

7. The process of claim 4 wherein the concentration of chitosan in the aqueous liquid is from about 3 ppb to about 10 ppb, and wherein the degree of acetylation of the chitosan is from 0% to about 70%.

8. A process or method of controlling fluid loss in permeable formations penetrated by a wellbore comprising: (a) admixing an aqueous liquid with an acid to provide the aqueous liquid with a pH less than about 4.5 and chitosan under conditions of shear and for a period of time sufficient to partially solublize the surface of the chitosan particles but insufficient to completely solublize and disperse the chitosan particles; (b) admixing the chitosan-containing acidic liquid from step (a) with a base to raise the pH of the liquid to at least about 6.5; (c) introducing the chitosan-containing liquid into the wellbore and into contact with a face of the permeable formation; and (d) producing a filter cake comprised of particles of the partially hydrated chitosan upon the face of the formation whereby fluid loss to the formation through the filter cake is reduced.

9. The process of claim 8 wherein the degree of acetylation of the chitosan is from 0% to about 70%.

10. The process of claim 8 wherein the degree of acetylation of the chitosan is from 0% to about 30%.

11. The process of claim 8 wherein the aqueous liquid from step (b) is mixed with a drilling fluid, completion fluid, or workover fluid prior to introducing the aqueous liquid into the wellbore.

12. The process of claim 8 wherein the concentration of chitosan in the aqueous liquid is from about 3 ppb to about 10 ppb.

13. The process of claim 8 wherein the concentration of chitosan in the aqueous liquid is from about 3 ppb to about 10 ppb, and wherein the degree of acetylation of the chitosan is from 0% to about 70%.

14. The process of claim 11 wherein the concentration of chitosan in the aqueous liquid is from about 3 ppb to about 10 ppb, and wherein the degree of acetylation of the chitosan is from 0% to about 70%.

15. A fluid for preventing or overcoming the loss of circulation of a drilling fluid while drilling a well borehole into a subterranean formation which comprises an aqueous liquid containing therein from 3 to 10 pounds per 42 gallon barrel of the drilling fluid of partially solublized chitosan particles wherein the chitosan particles have been partially solublized at pH less than about 4.5, and wherein the aqueous liquid has a pH of at least 6.5.

16. The fluid of claim 15 wherein the degree of acetylation of the chitosan is from 0% to about 70%.

17. The fluid of claim 15 wherein the degree of acetylation of the chitosan is from 0% to about 30%.

18. The fluid of claim 15 wherein the partially solublized chitosan particles contain a frizzy surface layer thereon.

19. The fluid of claim 16 wherein the partially solublized chitosan particles contain a frizzy surface layer thereon.

20. The fluid of claim 17 wherein the partially solublized chitosan particles contain a fuzzy surface layer thereon.

* * * * *